(12) United States Patent
Lynam (10) Patent No.: US 6,968,736 B2
(45) Date of Patent: *Nov. 29, 2005

(54) RAIN SENSOR MOUNTING SYSTEM

(75) Inventor: Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 180 days.

This patent is subject to a terminal disclaimer.

(21) Appl. No.: 10/348,514

(22) Filed: Jan. 21, 2003

(65) Prior Publication Data

US 2003/0126924 A1 Jul. 10, 2003

Related U.S. Application Data

(63) Continuation of application No. 10/023,162, filed on Dec. 17, 2001, now Pat. No. 6,516,664, which is a continuation of application No. 09/860,361, filed on May 18, 2001, now Pat. No. 6,341,523, which is a continuation of application No. 09/003,966, filed on Jan. 7, 1998, now Pat. No. 6,250,148.

(51) Int. Cl.$^7$ .............................................. G01W 1/00
(52) U.S. Cl. ................................................ 73/170.17
(58) Field of Search ..................... 73/170.17; 248/549; 250/208.1; 340/815.4

(56) References Cited

U.S. PATENT DOCUMENTS

| | | |
|---|---|---|
| 4,859,867 A | 8/1989 | Larson et al. ............... 307/10.1 |
| 4,871,917 A | 10/1989 | O'Farrell et al. ........... 250/341 |
| 4,916,374 A | 4/1990 | Schierbeek et al. ......... 318/483 |
| 4,956,591 A | 9/1990 | Schierbeek et al. ......... 318/483 |
| 4,973,844 A | 11/1990 | O'Farrell et al. ........... 250/341 |
| 5,266,873 A | 11/1993 | Arditi et al. ................. 318/483 |
| 5,820,097 A | 10/1998 | Spooner ...................... 248/549 |
| 5,923,027 A | 7/1999 | Stam et al. ............... 250/208.1 |
| 6,222,460 B1 | 4/2001 | Deline et al. ............ 340/815.4 |
| 6,250,148 B1 | 6/2001 | Lynam .................... 73/170.17 |
| 6,341,523 B2 * | 1/2002 | Lynam .................... 73/170.17 |

FOREIGN PATENT DOCUMENTS

| | | |
|---|---|---|
| DE | 4214223 A1 | 11/1993 |
| DE | 4410217 A1 | 9/1995 |
| EP | 0461424 A2 | 12/1991 |

OTHER PUBLICATIONS

European Search Report dated Mar. 6, 2002.
Japanese Abstract for Document No. 59,029,539.

* cited by examiner

Primary Examiner—Edward Lefkowitz
Assistant Examiner—Jewel V. Thompson
(74) Attorney, Agent, or Firm—Van Dyke, Gardner, Linn & Burkhart, LLP (57) ABSTRACT

A vehicular rain sensor mounting system comprises a module assembly adapted for attachment to an attachment member on the inner surface of a vehicle windshield. The module assembly comprises a first side configured to be generally adjacent the inner surface of the vehicle windshield and a second side generally opposing the first side. A rearview mirror assembly mounting member is provided at the second side. The system further comprises a rearview mirror assembly having a mirror mount adapted for attachment to the rearview mirror assembly mounting member provided at the second side of the module assembly. The module assembly includes a rain sensor having a detecting surface. The detecting surface of the rain sensor contacts the inner surface of the windshield when the module assembly is attached to the attachment member on the inner surface of the vehicle windshield.

191 Claims, 4 Drawing Sheets

RAIN SENSOR MOUNTING SYSTEM

This application is a continuation application under of application Ser. No. 10/023,162, filed Dec. 17, 2001 now U.S. Pat. No. 6,516,664, by Niall R. Lynam, entitled, RAIN SENSOR MOUNT FOR USE IN A VEHICLE, which is a continuation application of U.S. pat. application Ser. No. 09/860,361, filed May 18, 2001, now U.S. Pat. No. 6,341,523, which is a continuation application of U.S. pat. application Ser. No. 09/003,966, filed on Jan. 7, 1998, now U.S. Pat. No. 6,250,148, which are incorporated by reference herein in their entireties.

TECHNICAL FIELD AND BACKGROUND OF THE INVENTION

This invention relates to a vehicular rearview assembly. More particularly, the present invention relates to mounting of a rain sensor within a rearview mirror assembly support.

Rain sensors for detecting moisture due to rain, road splash, and the like on the outside of a vehicular windshield are conventionally mounted to the inner cabin surface of the vehicle windshield. Rain sensors typically comprise a light emitting diode, an array of light emitting diodes which are paired with a photo detector, or an array photo detectors. The rain sensor may detect moisture by sensing a change in the amount of light refracted at the outer windshield surface due to the presence or absence of moisture or use other techniques such as sending backscattering of light caused by raindrops.

Various mounting methods have been proposed with a common method including optically coupling the rain sensor detector usually to the inner cabin surface of the vehicle windshield. Rain sensor detectors are conventionally coupled to the inner cabin surface by use of an optical adhesive, or by using a removable mount, for example a mount of a type disclosed in U.S. Pat. 4,871,917 to O'Farrell assigned to Donnelly Corporation of Holland, Mich., the disclosure of which is incorporated by reference herein. In removable mount constructions, such as are disclosed in the Donnelly '917 Patent, the rain sensor detection surface, which typically comprises a resilient optically clear polymer material, such as a silicone material, is mechanically pressed between the detector and the inner windshield surface by the mount.

Thus far, conventionally known means for mounting rain sensor units to vehicle windshields have several disadvantages. Optical adhesives are difficult and expensive to remove during service replacement of a damaged windshield. Furthermore, the optical adhesives, which are used to attach the rain sensors to the inner surface of the windshield, may be visible from the outside of the vehicle and, thus, can potentially detract from the vehicle appearance and styling. Moreover, the attachment of the rain sensor to the windshield either by bonding with an adhesive or by mechanical attachment often creates a noticeable obstruction of the forward field of view due to the separate and, frequently, bulky housing provided for the rain sensor unit. Furthermore, the location and bulky size of the rain sensor unit may further increase the risk of potential injury of the vehicle occupants should they impact the windshield in an accident.

In general practice, the windshield manufacturer often attaches a mirror mounting button to the windshield, for example a mounting button of the type disclosed in U.S. Pat. No. 4,930,742 assigned to Donnelly Corporation, which provides a releasable mount for the rearview mirror assembly to the windshield, the disclosure of which is incorporated in its entirety herein. When these mounting buttons are attached to the windshield, the manufacturer may need to attach a second structure, such as a mechanical guide or rail to which the rain sensor is then later attached to the vehicle, which would ultimately increase the cost of the windshield.

Figure 7:
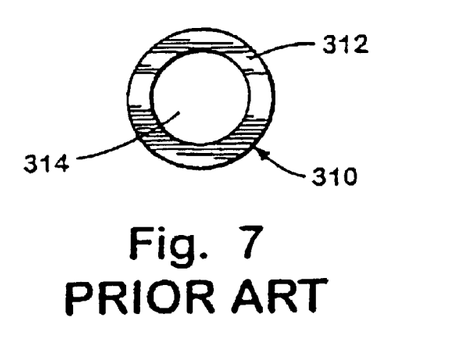
FIG. 7 is a front elevational view of a prior art mounting button.
Figure 8:
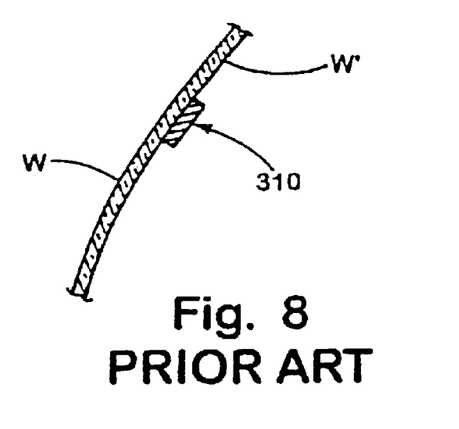
FIG. 8 is a side elevational view of the prior art mounting button mounted to the inner surface of a windshield.
Figure 9:
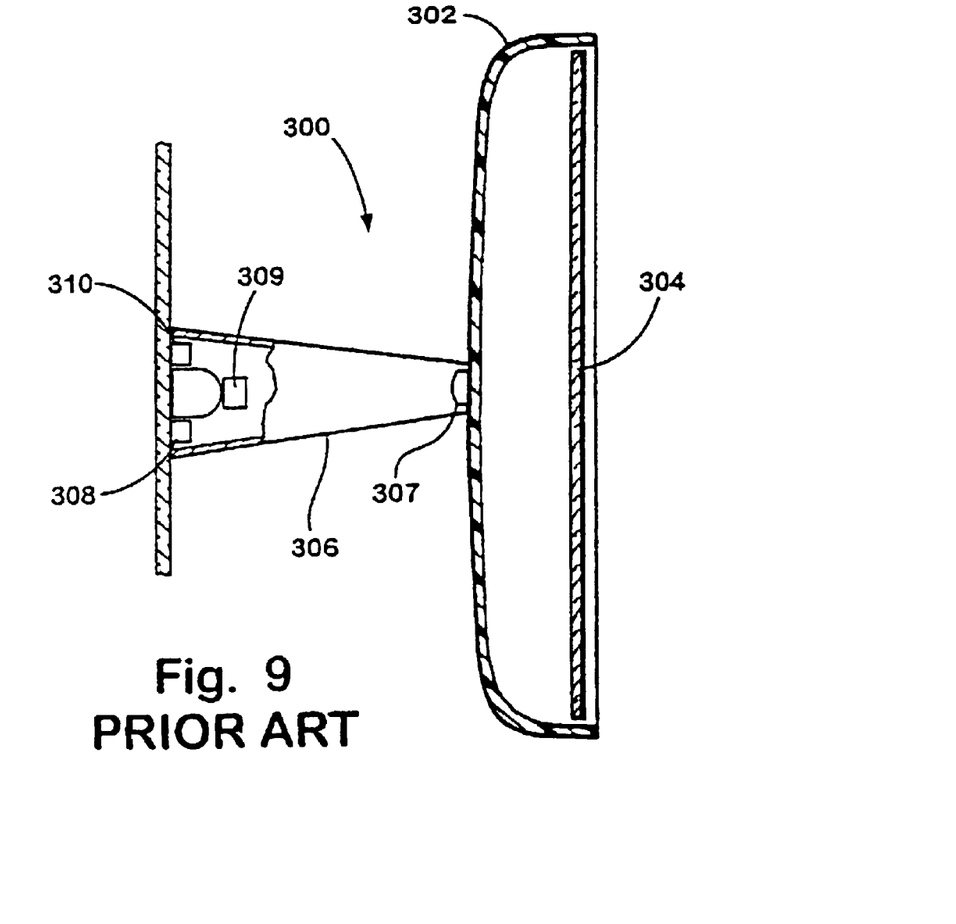
FIG. 9 is a side elevational view of a conventional mirror assembly incorporating a rain sensor unit in the support arm of the mirror assembly.

More recently, rain sensors have been mounted within the support arm of the interior rearview mirror assembly. These constructions utilize the teaching of the Donnelly '917 patent as follows. Referring to FIGS. 7–9, this prior art interior rearview mirror assembly 300 includes a mirror housing 302 which supports a reflective element 304 and which is mounted to the windshield W by a support arm 306. Support arm 306 is coupled to housing 302 by a ball and socket connection 307. The rain sensor 308 is mounted inside support arm 306 and positioned to view the outside surface of windshield W. Support arm 306 includes a biasing member 309 and is adapted to releasably engage a mirror mounting button 310, which is attached to the inner surface W' of the windshield W and typically installed by the window manufacturer for coupling rearview mirror assembly 300 to the windshield (FIG. 9). In this system, mirror mounting button 310 is a ring shaped member 312 with a hollow center 314, which is glued to the inner surface of the vehicle windshield. Support arm 306 engages the outer rim of mirror mounting button 310 when the mirror assembly 300 is attached to button 310 during assembly of the vehicle at the vehicle assembly plant or during service. The rain sensor is located within the cavity of the support arm approximate the mirror mounting button and is biased into contact with the glass surface through hollow center 314 by biasing member 309. Support arm 306, however, only provides a single point of articulation for housing 302, since it must remain in a fixed position at the juncture of the support arm and the windshield in order to maintain the alignment of the sensor with the mounting button.

Although the aforementioned construction has several advantages, it has numerous disadvantages that can limit its widespread application in vehicles. By locating the rain sensor within the support arm, the support arm must necessarily include a cavity that is large enough to accommodate the rain sensor unit. Furthermore, this construction requires that the articulation of the mirror housing about the support arm be limited to a single point at the juncture of the support arm to the housing. As mentioned above, the juncture of the support arm to the mounting button must remain fixed so that rain sensor maintains contact with the inner surface of the windshield. Therefore, the present design is limited for use on single pivot mirror supports and is unsuitable for dual pivot mounting supports, which are commonly used on a wide variety of vehicles. It is also necessary to stock a special mirror design when a rain sensor is desired, which adds to inventory requirements.

Referring to U.S. Pat. Nos. 4,936,533 and 5,100,095 both assigned to Donnelly Corporation, the disclosures of which are incorporated by reference in their entireties, dual pivot mounting supports typically include a double ball joint which comprises an outer tubular support arm member with sockets formed at both ends. The sockets receive ball joints extending from the housing and mirror mounts to provide a greater range of movement for the rearview mirror assembly. Positioned in the cavity of the tubular member is a helical spring which retains the respective ball joints in the ends of the tubular support arm. Therefore, double ball joint mirrors would appear to not be well suited to accommodate a rain sensor unit within the support arm cavity.

Other considerations include vibration performance. The presence of the rain sensor in the support arm increases the weight of the rearview mirror assembly. With increased weight, potential exists for detrimental effects on the mirror assembly vibration performance. Furthermore, placement of the rain sensor in the support arm limits the choice of rearview mirror suppliers since only a limited number of mirror assembly support arm designs can accommodate such mounting of the rain sensor. Additionally, most countries have regulations that require mirror assemblies to break away upon impact in an accident. With the design illustrated in FIGS. 7–9, the choice of the mirror button design is, therefore, also limited, thus placing potential limitation on the use of these rain sensor mounts in certain countries.

Consequently, there is a need for an improved rain sensor mount for a vehicle that overcomes the above disadvantages and achieves its purpose in a manner that is economical and convenient for the automaker. Furthermore the improved rain sensor mount preferably provides broad application by allowing flexibility in the choice of design. Moreover, the improved rain sensor preferably is consistent with current safety goals and enhances the performance of the interior rearview mirror assembly.

SUMMARY OF THE INVENTION

Accordingly, the present invention provides a new and unique rain sensor mounting which is especially suitable for mounting on an inner surface of a vehicle windshield for detecting moisture on an outer surface of the windshield.

In one aspect, the invention provides a mount for mounting a rain sensor which includes a housing having an access opening on a first side or end and a port on a second side or end, preferably an opposing side or end, for positioning adjacent an inner surface of the vehicle windshield and which is adapted for mounting to a vehicle windshield. A cover is secured to the housing and covers the access opening. A mirror mounting button is provided on either the housing or the cover for mounting a rearview mirror assembly to the mount. A biasing member is supported in the housing and, preferably, is interposed between the cover and a rain sensor positioned in the housing. The biasing member urges a detecting surface of the rain sensor to project through the port and to optically couple to the vehicle windshield for detecting moisture on an outer surface of the vehicle windshield. The biasing member may comprise, for example, a helical spring, a leaf spring or a urethane disc. The biasing member may also include an internal structure of the housing that engages with the rain sensor when the housing is received on a mounting member that encompasses an opening (such as is described below) such that the detecting surface of the rain sensor is urged to project through the opening at the mounting member and intimately and, preferably, releasably contact the inner surface of the windshield, and optically couple therewith. For example, the internal cavity of the housing can comprise a resilient polymer material (such as a rubber, silicone, urethane, elastomeric (such as a thermoplastic elastomer), vinyl (such as plasticized polyvinyl chloride) or similar material with spring-like property) serving as a biasing member that urges the detecting surface of the rain sensor forward to contact the windshield when the unit is mounting in the vehicle. The biasing member may comprise a flexible polymer or a resilient gasket that compresses to urge the detecting surface of the rain sensor to contact the windshield when mounted in the vehicle.

In one form, the mirror mounting button is secured to the cover. The mirror mounting button may releasably secured to the cover or may be integrally molded with the cover to form a unitary member.

In other forms, the second side of the housing includes a layer of adhesive for mounting the housing to the vehicle windshield. For example, the adhesive may comprise a polyvinyl butyral material, an epoxy material, a urethane material, an acrylate material, an acrylic material, or a silicone adhesive material. The adhesive layer may include an opening for receiving the rain sensor whereby the detecting surface of the rain sensor can directly contact the vehicle windshield for detecting moisture on the outer surface of the windshield or the detecting surface can contact and optically couple to the cured form of said adhesive.

In yet another form, the mount includes an annular or like member having a central opening and which is adapted to mount the housing to the inner surface of the windshield. The port of the housing is aligned with the central opening of the annular member so that the rain sensor can extend through the port and through the central opening and contact the inner windshield surface for detecting moisture on an outer surface of the vehicle windshield. The housing is preferably releasably secured to the annular member so that the rain sensor can be serviced or replaced. In addition, at least the second side of the housing substantially covers and conceals the annular member.

According to another aspect of the invention, a rain sensor mount includes a housing having a cover, which covers an access opening in the housing, a means for mounting a rearview mirror assembly to the housing, and a rain sensor, which is positioned in the housing and includes a detecting surface. Furthermore, a biasing member is interposed between a portion of the housing and the rain sensor for urging the detecting surface of the rain sensor to optical couple to the windshield of the vehicle for detecting moisture on an outer surface of the windshield.

According to yet another aspect of the invention, a rearview mirror assembly is disclosed which includes a rearview mirror housing having a reflective element supported therein, a support arm mounted to the rearview mirror housing that terminates in a button attaching mirror mount, and a rain sensor module. The rain sensor module includes a rain sensor module housing having a first side or end and a second side or end, with the second side preferably including a port. The second side is positioned adjacent an inner surface of the vehicle windshield and is adapted to mount the rain sensor module housing to the vehicle windshield. The rain sensor module housing preferably also includes a cover, which covers an access opening provide in the rain sensor module housing and a rain sensor which is supported in the rain sensor module housing. Alternately, the rain sensor module may be a unitary member or construction wherein the rain sensor is housed, preferably resiliently housed, within the cavity of the housing such that the detecting surface of the rain sensor is positioned, and preferably urged to protrude, at the second side (end) of the housing that is opposite and opposing the first side (end). The rain sensor includes a detector surface, which preferably is extended though a port provided in the housing for optically coupling the rain sensor to the inner surface of the vehicle windshield. A mirror mount extends from the housing, for securing the support arm to the housing. Furthermore, the rain sensor module housing includes a biasing member supported therein which is interposed between a portion of the rain sensor module housing and the rain sensor for urging the detecting surface of the rain sensor to optically couple the rain sensor to the vehicle windshield for detecting moisture on an outer surface of the vehicle windshield. The rain sensor module can be provided in a variety of constructions, thus providing economic, convenience and flexibility benefits to automakers and their suppliers. For example, the housing of the rain sensor module and the mirror mount extending therefrom can be a unitary construction (such as can be formed by mechanically attaching or adhesively attaching a mirror mounting button to an already formed housing, or by attaching the mirror mounting button to the housing while the housing itself is being formed, such as by integral molding as is known in the molding arts), or the rain sensor, housing and mirror mount can be provided as a unitary construction, such as a unitary rain sensor module.

In one form, the support arm is secured to the rearview mirror housing by a ball and socket connection to permit repositioning of the reflective element. Additionally, and preferably, the support arm may be secured to the mirror mount by a second ball and socket connection to permit a greater range of motion for the rearview mirror housing and provide a greater range of positions for the reflective element.

As will be understood, the rain sensor mount of the present invention provides numerous advantages over prior known rain sensor mounting arrangements. For example, the rain sensor module can be attached by the windshield manufacturer at the time of the windshield fabrication and shipped to the automobile assembly plant where the rearview mirror assembly can be attached to the rain sensor module. Alternatively, the annular member may be attached to the windshield by the windshield manufacturer at the time of fabrication leaving the installation of the rain sensor module assembly optional. For example, windshields with the rain sensor mount pre-attached can be received at the vehicle assembly plant, and the rain sensor module can be attached, and the rearview mirror assembly also attached to the module, as the vehicle passes along the vehicle assembly line. Furthermore, the rain sensor mount can be mounted without detracting from the styling of the vehicle and, moreover, without obstructing the view of the driver of the vehicle. In addition, the rain sensor mount can be adapted to support a wide range of rearview mirror assemblies and, notably, rearview mirror assemblies with double ball joint support arms to permit a greater range of motion of the mirror assembly housing than the present rains sensor mounts permit. Thus, the present rain sensor mount affords the automobile manufacturer greater flexibility in its selection of the mirror assembly and the button mount and therefore can accommodate most markets' regulations.

These and other objects, advantages, purposes and features of the invention will become more apparent from a study of the following description taken in conjunction with the drawings.

DESCRIPTION OF THE PREFERRED EMBODIMENTS

Figure 1:
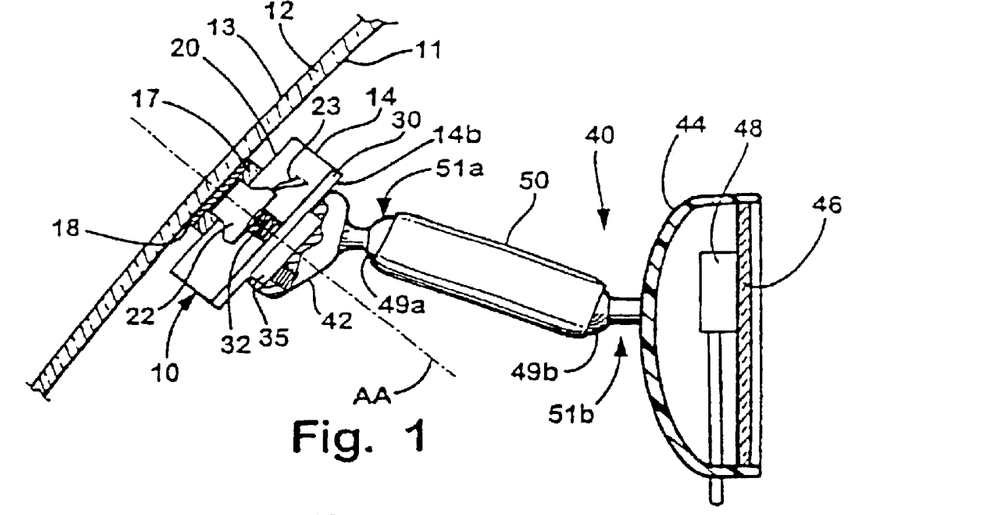
FIG. 1 is a partial fragmentary side elevation of a mirror assembly mounted to a vehicle windshield of the present invention.
Figure 2:
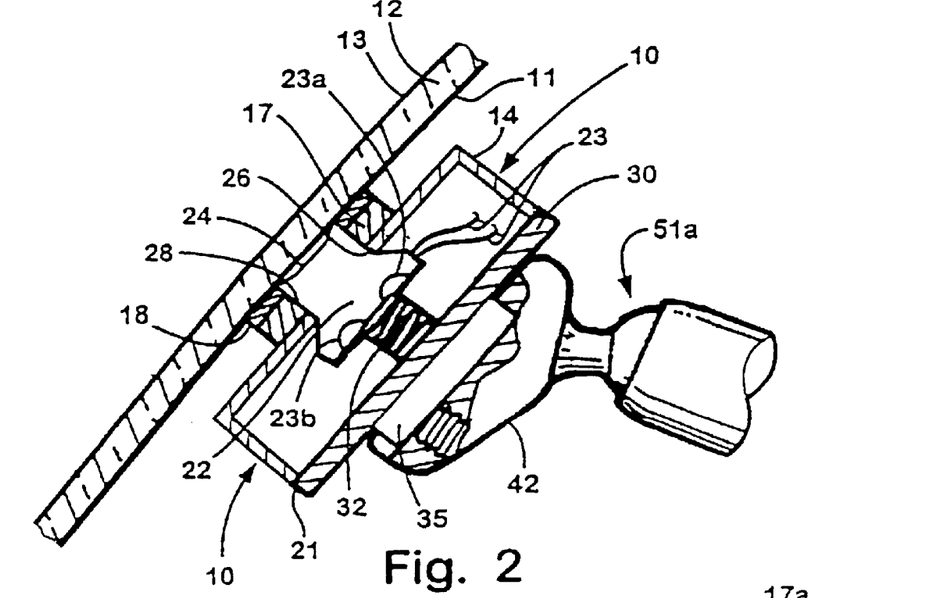
FIG. 2 is an enlarged partial fragmentary side elevation of the mirror assembly mounting of FIG. 1.
Figure 3:
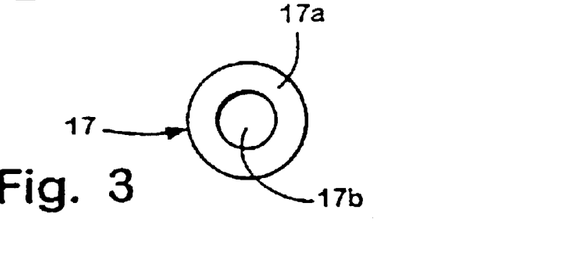
FIG. 3 is a front elevational view of the mirror mount of FIGS. 1 and 2.

Referring to FIGS. 1 and 2, a rain sensor module assembly 10 of the present invention is shown mounted to the inner surface 11 of a windshield 12. Rain sensor module assembly 10 is positioned on inner surface 11 of windshield 12 for detecting moisture, such as rain droplets, on the outer surface 13 and, optionally, on inner surface 11 of windshield 12, as will be more fully explained below.

Rain sensor module assembly 10 is mounted to inner surface 11 of windshield 12 by a rain sensor mounting button 17. Rain sensor mounting button 17 is preferably adhered to inner surface 11 of windshield 12 by a layer 18 of adhesive such as an epoxy, a polyvinyl butyral, a urethane, or a silicone adhesive material or the like. In the illustrated embodiment rain sensor mounting button 17 is circular in shape having a solid annular outer portion 17a and inner hollow open central portion 17b. Solid portion 17a of rain sensor mounting button 17 may comprise a polymer material, such as an engineering resin, a nylon or an ABS material, or can be a metal fabrication such as zinc casting or a sintered steel pressing or equivalent metal material such as steel, titanium, nickel, aluminum and their alloys, or the like.

Rain sensor module assembly 10 includes rain sensor unit 22, which is positioned in housing 14 and projects through an opening or port 26 provided on a windshield facing side 20 of housing 14 and extends through inner hollow open central portion 17b of rain sensor mounting button 17 to contact inner surface 11 of windshield 12. Rain sensor unit 22 preferably comprises a compact rain sensor unit available from ITT Automotive Europe, GMBH of Frankfurt, Germany. Rain sensor unit 22 includes a detecting surface 24 which projects through an opening 28 provided in adhesive layer 18 so that direct contact is achieved between inner surface 11 of windshield 12 and detecting surface 24 of rain sensor unit 22, and also includes a light emitting source 23a and a light detecting source 23b along with associated electronic circuitry for generating an electrical signal indicative of detection of moisture on the outer surface of the windshield. Light is emitted by the emitter, passes through the rain sensor detecting surface, is refracted at the outer windshield surface, and re-enters the rain sensor at its detecting surface to impinge the light detector of the rain sensor, whose output is processed by electronic circuitry to detect the presence/absence of moisture on the windshield. The circuitry (in whole or in part) can be contained in the rain sensor and/or within the housing of the module. Optionally, the electronic circuitry can be located/share components with/receive input from or deliver output electrical accessories in the vehicle, such as a CAN bus, electronically equipped mirrors such as lighted mirror and automatic dimming electrochromic mirrors, overhead consoles, and similar electrically functioning vehicle components. Electrical connectors 23 can be accommodated at the rain sensor module, such as at or on its housing. The rain sensor can be separately removable from the module for service, or can be an integral part of the module so that a unitary module is provided by a supplier to the automaker for mating with a windshield mounting member as the vehicle passes along the vehicle assembly line (or at a local ready-to-install windshield supply plant), and thereafter for attachment thereto of a rearview mirror assembly. The electrical signal output by the rain sensor can be used to automatically operate the wiper system for the windshield and/or the backlite, or operate other vehicular functions such as close a sunroof in the event of rain or change the braking and/or traction characteristics of the vehicle braking and/or traction control systems.

Housing 14 is adapted to urge rain sensor unit 22 into optical contact with inner surface 11 of windshield. In the illustrated embodiment, housing 14 includes a resilient member 32 for biasing detecting surface 24 into contact with inner surface 11 of windshield 12. Resilient member 32 preferably comprises a helical spring, urethane disc, or the like. Resilient member 32 may be integrally formed with housing 14 or may be interposed between rain sensor unit 22 and a portion of housing 14, for example a cabin facing side 14*b* or back portion or member 30 of housing 14. Back portion 30, may preferably comprise a removable cover 30*a* which permits access to rain sensor unit 22. Cover 30*a* is positioned over an access opening 21 provided on housing 14 and is mounted to housing 14 by releasable fasteners, such as clips, screws, latches, or the like. In this manner, rain sensor unit 22 can be easily removed for service or replacement.

Housing 14 of rain sensor module assembly 10 is preferably releasably or removably mounted or attached to rain sensor mounting button 17 by attachment to solid portion 17*a* of rain sensor mounting button 17, for example by mechanical means such as by snap-on or twist-on attachment or, alternatively, by a releasable adhesive layer. Rain sensor mounting button 17 may comprise of a variety of shapes including square, rectangular, trapezoidal, triangular and the like, with a central opening through which rain sensor unit 22 extends to position detecting surface 24 into contact with either the inner surface 11 of windshield 12 or the outer surface of the adhesive layer 18. Preferably, the outer rim of rain sensor mounting button 17 has a smooth edge radius for safety purposes, for example an edge radius of greater than or equal to two millimeters. Also, the attachment of rain sensor module 10 to rain sensor mounting button 17 is preferably a breakaway mount, which meets government and automaker safety requirements upon impact during an accident. The mounting member attached to the vehicle windshield such as rain sensor mounting button 17 can have a wide variety of shapes and forms. It is desirable that there be an adequate contact area with the windshield surface to assure long term integrity of the joint thereto under the loading conditions experienced during lifetime use in the vehicle. The weight of the rearview mirror assembly attached to the mirror mounting button of the rain sensor module can vary from about 100 grams to about 500 grams, or even higher dependent on the feature content of the mirror assembly. The rain sensor module itself is preferably fabricated of lightweight materials, and preferably weighs less than about 100 grams, more preferably less than about 50 grams, and most preferably less that about 25 grams. The mounting member may have a contiguous perimetal portion encompassing a central opening (such as an annulus with a central hole transverse therethrough so that a portion of the inner surface of the windshield is exposed threat), or the mounting member can be non-contiguous (for example, two spaced apart rails attached to the windshield encompassing an opening therebetween where the detecting surface of the rain sensor can contact the windshield, or the mounting member can be a single rail with an adjacent portion of the inner surface of the windshield serving as the opening for contacting of the rain sensor to the windshield). Also, the rain sensor module can be received on the mounting member such that its engagement on the support attached to the windshield causes the detecting surface of the rain sensor to be urged forward towards, and to contact, the windshield. The module itself, in cooperation with its mounting member on the windshield, serves at least partially as a biasing member.

Mounted to cabin facing side 14*b* of housing 14 is a mirror mounting button 35 for mounting a mirror assembly 40 to rain sensor module assembly 10. Mirror mounting button 35 is preferably mounted to back portion 30 of housing 14 using conventional mechanical attachment means, including fasteners and the like. Alternatively, mounting button 35 may be molded with back portion 30 to form a single integral unitary member or construction. Mirror mounting button 35 provides a mount for one of a plurality of known types of interior mirror assemblies. Preferably, mirror mounting button 35 and housing 14 are substantially coaxial and, furthermore, are both coaxial with rain sensor mounting button 17. In this manner, rain sensor mounting button 17, rain sensor module assembly 10 and mirror assembly 40 are coaxially aligned and are mounted on windshield 12 using the same footprint, thus, minimizing the obstruction to the driver.

As best seen in FIG. 1, mirror assembly 40 comprises a double-ball-joint interior mirror assembly which is detachably mounted to mounting button 35 by a mirror mount 42. Mounting button 35 is preferably made from an engineering polymer material such as a glass or mineral filled nylon or similar ensuring plastic cover. Alternatively, mounting button 35 may be made from a zinc casting or sintered steel pressing or equivalent metal material (such as steel, nickel or nickel alloy, titanium, aluminum or the like), and, preferably is adhered to back portion 30, which preferably comprises a plastic material. Alternatively, mounting button 35 may be mechanically or integrally molded therewith.

Mirror mount 42 engages the outer periphery of button 35 and provides a breakaway connection so that upon an impact, interior mirror assembly 40 will detach from button 35, thereby reducing the risk of injury to passengers in the vehicle. Reference is made to U.S. patent application Ser. No. 08/78 1,408 entitled BREAKAWAY ACCESSORY MOUNTING ASSEMBLY FOR VEHICLES AND WINDSHIELD MOUNTED BUTFON THEREFOR filed Jan. 10, 1997 by Ralph A. Spooner, now U.S. Pat. No. 5,820,097, which is assigned to Donnelly Corporation of Holland, Mich., the disclosure of which is incorporated by reference in its entirety herein, for a preferred form of mounting button 35. Reference is also made to U.S. Pat. Nos. 4,936,533 and 5,100,095 for examples of suitable double ball joint rearview mirror assemblies.

Interior mirror assembly 40 includes a mirror housing 44, which supports a mirror reflector element 46 and an actuator for changing the mirror reflectivity of the mirror reflective element 46. Reflector element 46 may comprise a prismatic mirror element or a variable reflectance electrochromic mirror element, for example the reflective element 46 may comprise a conventional non-electro-optic mirror element including metallic reflector coated glass substrate such as with a thin chromium reflector coating or may include a non-metallic reflector, such as a dichroic such as is described in U.S. Pat. No. 5,207,492 to Roberts et al. or may be a reflector comprising a silicon reflective layer such as is described in U.S. Pat. No. 5,535,056 to Caskey et al. which is herein incorporated in its entirety by reference. Alternatively, reflective element 46 may comprise a variable reflective electro-optic element such as an electrochromic mirror element and may comprise one of several types of electrochromic elements—the electrochemichromic type, such as that disclosed in U.S. Pat. No. 5,140,455 issued to Varaprasad et al. and commonly assigned with the present application, the disclosure of which is hereby incorporated herein by reference or may be of the solid state type such as that disclosed in the U.S. Pat. No. 4,712,879 issued to Niall R. Lynam et al., U.S. patent application Ser. No. 08/023,675, filed Feb. 22, 1993 by Varaprasad et al., U.S. patent application Ser. No. 08/193,557, filed Feb. 8, 1994 by Varaprasad et al., and U.S. application Ser. No. 08/238,521, filed Mar. 5, 1994 by Varaprasad et al., now U.S. Pat. No. 5,668,663, all commonly assigned with the present application to Donnelly Corporation, the disclosures of which are herein incorporated by reference. Such electrochromic elements comprise an electrically responsive electrochromic medium that modulates reflectivity from a reflective element. Such electrochromic mirror elements are continuously variable and exhibit multiple partial reflectant states as the voltage applied thereto is varied. Alternatively, reflective element 14 may comprise other electro-optic mirror elements, such as a liquid crystal mirror and the like. Actuator 48 may comprise a manual flip mechanism, for a conventional prismatic mirror element, or an electrical actuator with circuitry for a variable reflectivity electrochromic mirror element. The rearview mirror assembly may be an electrically operated assembly such as the lighted mirror assemblies described in pending U.S. patent application Ser. No. 08/918,772, entitled MODULAR REARVIEW MIRROR ASSEMBLY, filed on Aug. 25, 1997 by Jonathan E. DeLine, Roger L. Veldman, and Niall R. Lynam, now U.S. Pat. No. 6,124,886, and assigned to Donnelly Corp of Holland, Mich., which is herein incorporated in its entirety by reference. Mirror housing 44 is attached to mirror mount 42 by a support arm 50. Preferably, mirror mount 42 and housing 44 each include ball joints 49a and 49b which are secured in opposed ends of support arm 50 to provide a dual pivot rearview mirror assembly. In this manner, mirror housing 44 may be pivoted about a first ball socket joint 51a and/or a second ball socket joint 51b.

Figure 4A:
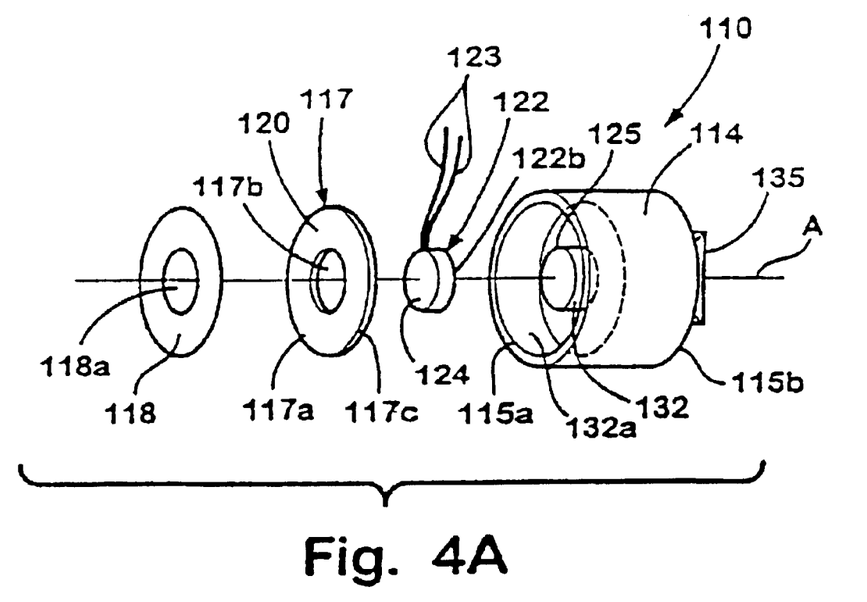
FIG. 4A is an exploded perspective view of a second embodiment of the mirror assembly mounting of the present invention.
Figure 4B:
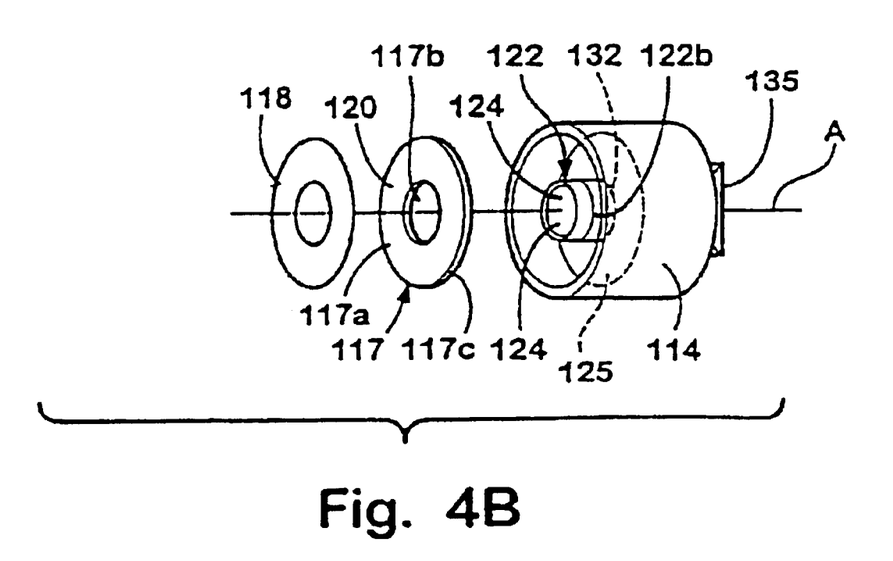
FIG. 4B is a partial exploded perspective view of the second embodiment of mirror assembly mounting of FIG. 4A.

Referring to FIGS. 4A and 4B, a second embodiment 110 of a rain sensor module assembly of the present invention is shown. Rain sensor module assembly 110 includes a generally cylindrical housing 114 having one end 115a adapted for mounting on a rain sensor mounting button 117, which in turn is mounted to windshield 12', and a second end 115b which includes a mirror mounting button 135 for mounting an exterior mirror assembly (not shown in this embodiment) to housing 114. Housing 114 is preferably formed from a rigid polymer material, such as an engineering resin, a nylon, a polyolefin, such a polypropylene and an ABS material or from a rigid metal formed by a metal fabrication, such as die cast or the like. Similar to the first embodiment, rain sensor mounting button 117, housing 114, and mirror mounting button 135 are preferably substantially aligned along a common axis A to provide a substantial coaxial mounting of a mirror assembly and rain sensor module assembly 110, which minimizes the obstruction of the driver's view through the windshield, and which minimizes the overall assembly footprint, as well as optimizing appearance when viewed from the outside of the vehicle.

Rain sensor mounting button 117 is preferably circular in shape having a solid annular outer portion 117a and inner hollow open central portion 117b. Solid portion 117a of rain sensor mounting button 117 preferably comprises a polymer material, such as an engineering resin, a nylon, a polyolefin such as polypropylene and an ABS material or may be formed from a metal fabrication, such as zinc casting or a sintered steel pressing or equivalent metal material such as aluminum, titanium, nickel and their alloys, or the like. Rain sensor mounting button 117 is adhered to an inner surface 11' of windshield 12' by a layer 118 of adhesive, for example an epoxy, a polyvinyl butyral, a urethane, or a silicone adhesive material or the like. Layer 118 is interposed between a windshield facing side 120 of outer portion 117a of rain sensor mounting button 117 and windshield 12'. Preferably, layer 118 extends over at least a substantial portion of windshield facing side 120 of rain sensor mounting button 117, preferably terminating at or near the outer perimeter 117c of rain sensor mounting button 117. It should be understood, however, that discrete regions of adhesive layer may also be used to attach rain sensor mounting button 117 to windshield 12.

Housing first end 115a is preferably adapted to rotate or twist onto rain sensor mounting button 117 and is, preferably, mounted to rain sensor mounting button 117 in a break-away mounting so that housing 114 and the interior mirror assembly will detach from rain sensor mounting button 117 when any one of the housing and the mirror assembly are impacted. Mirror mounting button 135 is mounted to second end 115b of housing 114 or may be integrally molded therewith, similarly to button 35 described in reference to the first embodiment.

Housing 114 includes a cavity 125 in which a rain sensor unit 122 is positioned. Rain sensor module assembly 110 may include rain sensor unit 122 as a separate component or may include rain sensor unit 122 fixed to or encapsulated by housing 114 to form a modular unit, which provides for a single step replacement procedure. Rain sensor unit 122 and its associated electronic circuitry 123 are supported, and positioned in cavity 125 of housing 114 for viewing windshield 12' and are biased into optical contact with windshield 12' by a resilient member 132, as will more fully described below.

Similarly to the first embodiment, rain sensor unit 122 preferably comprises a rain sensor unit such as is available from ITT Automotive Europe, GMBH. In this embodiment, rain sensor unit 122 has a disc or truncated cylindrical shaped body with a detecting surface 124 formed on a windshield facing side 122a of sensor unit 122, which preferably comprises a resilient optical material, such as a silicone or a plasticized polymer, and which is preferably a high transmitter of visible and near-infrared radiation. The rain sensor unit is preferably of compact construction. For example, the ITT unit is a cylindrical shaped body with a circular end face of diameter about 3.3 cm (cross-sectional area of about 8.6 square centimeters) and a body length of about 1.2 cm. For compact mounting on the vehicle, it is preferable that the cross-sectional area of the rain sensor module be less than about four square inches, more preferably less than about two square inches, and most preferably be less than about one square inch provided that adequate contact area is provided for the detecting surface of the module to the windshield for detection of moisture on the outer windshield surface. The body length of the rain sensor module is preferably less than about 1.5 inches, more preferably less than about 1 inch and most preferably less than about 0.75 inches. The ratio of cross-sectional diameter to body length for the rain sensor module is preferably greater than 1, more preferably greater than 2, most preferably greater than 3 in order to assure adequate contact area to the windshield and minimum rearward intrusion into the cabin of the vehicle by the rain sensor module, and the rearview mirror attached thereto. Sensor unit 122 is positioned in central opening 117b of rain sensor mounting button 117 with a cabin facing side 122b of rain sensor unit 122 being aligned with resilient member 132 so that when housing 114 is mounted on rain sensor mounting button 117, rain sensor unit 122 is biased toward windshield 12'. As described in reference to the first embodiment, detecting surface 124 may be urged into direct contact (where it may be optionally releasably adhered) with inner surface 11' of windshield 12 through an opening 118a provided in adhesive layer or may be urged into contact with adhesive layer 118 to similarly optically couple sensor unit 122.

Resilient member 132 may comprise a spring, such as a helical spring or a urethane or plastic disc, which is positioned in cavity 125. Alternatively, resilient member 132 may comprise a resilient inner surface or member, such as a wall 132a, provided in housing 114. For example, the interior of housing 114 may include a spring-like polymer such as a rubber, a silicone, a urethane, an elastomeric (such as a thermoplastic elastomer), a vinyl (such as plasticized polyvinyl chloride) or similar resilient material that urges the detecting surface of the rain sensor to intimately contact and optically couple with the inner windshield surface when the unit is mounted in a vehicle. As described previously, resilient member 132 is aligned with rain sensor unit 122 and urges detecting surface 124 into optical contact with inner surface 11' of windshield 12. Therefore, regardless of whether rain sensor unit 122 is a separate component or an integral component of housing 114, it can be appreciate that the installation of rain sensor module assembly 110 is greatly simplified. Rain sensor mounting button 117 is adhered to the inner surface 11' of windshield 12', typically by the windshield manufacturer, and then rain sensor unit 122 is placed in opening 117b and held in place and urged into optical contact with windshield 12' by housing 114.

Figure 5:
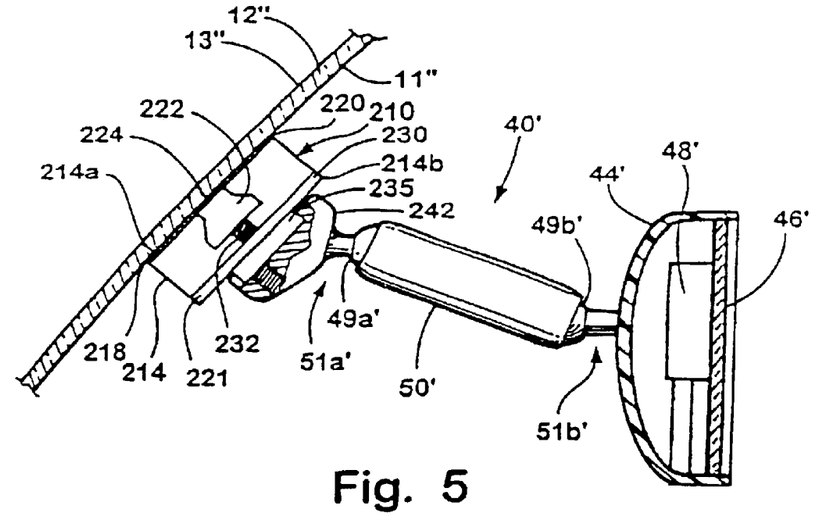
FIG. 5 is a partial fragmentary side elevational view of a third embodiment of the mirror assembly mounting of the present invention.

Referring the FIG. 5, a third embodiment 210 of the rain sensor module assembly is illustrated. Rain sensor module assembly 210 is of a similar construction to rain sensor module assembly 10 and includes a housing 214 which is directly mounted to the inner surface 11" of windshield 12". Rain sensor module assembly housing 214 is adhered to inner surface 11" of windshield 12" by a layer 218 of adhesive, for example an epoxy, a polyvinyl butyral, a urethane, or a silicone adhesive material or the like. Layer 218 is interposed between a windshield facing side 220 of housing 214 and windshield 12". Preferably, layer 218 extends over at least a substantial portion of windshield facing side 220 of housing 214 and preferably terminates at or near the outer perimeter 214a of housing 214. It should be understood, however, that discrete regions of adhesive layer may also be used to attach housing 214 to windshield 12", but this may be less desirable since it may detract from the aesthetic appearance of the rain sensor mounting.

Figure 6:
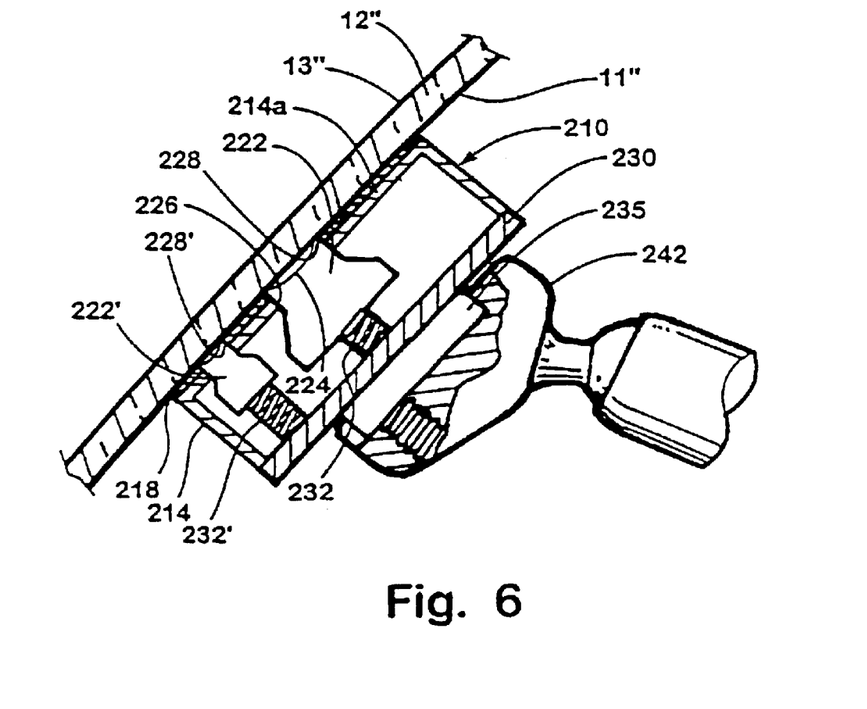
FIG. 6 is an enlarged partial fragmentary side elevation of the mirror assembly mounting of FIG. 5.

Rain sensor module assembly 210 includes at least one rain sensor unit 222 and associated electronic circuitry, which is supported and positioned in housing 214 for viewing windshield 12". Rain sensor unit 222 preferably comprises a rain sensor unit available from ITT Automotive Europe, GMBH of Frankfurt, Germany, and includes a detecting surface 224. Detecting surface 224 preferably comprises a resilient optical material, such as a silicone or a plasticized polymer, and which is preferably a high transmitter of visible and near-infrared radiation. As best seen in FIG. 6, detecting surface 224 of rain sensor unit 222 is positioned in and projects through an opening or port 226 provided in windshield facing side 220 of housing 214. Furthermore, detecting surface 224 projects through an opening 228 provided in layer 218 so that detecting surface 224 makes direct contact with inner surface 11" of windshield 12". Thus, rain sensor unit 222 is optically coupled with inner surface 11" of windshield 12". Alternately, detecting surface 224 of rain sensor unit 222 may be biased against and may contact the surface of adhesive layer 218 via opening 226 in housing 214. In this application, the detecting surface 224 of sensor unit 222 may have little or no resilience. Instead, the resiliency may be provided at the contact point with the adhesive layer 218. Therefore, in this case adhesive layer 218 is preferably selected from materials which are resilient or spring-like in their cured state, such as provided by polyvinyl butyral and silicone adhesive, or the like.

Housing 214 includes a back portion or member 230, which may comprise a removable cover 230a which is secured to housing 214 by one or more fasteners, such as screws, clips, snaps, latches, or the like. Housing 214 and back member 230 are preferably made from a polymer material such as a nylon, ABS, engineering resin, a polyolefin such as polypropylene or similar material. Removal of cover 230a permits access to rain sensor unit 222 and its associated circuitry for replacement or repair. Where back member 230 comprises a removable cover, housing 214 preferably includes an access opening 221 which is sufficiently large to permit removal of rain sensor unit 222 and its associated circuitry through the cabin facing side 214b of housing 214. Alternatively, rain sensor module assembly 210 may comprise a unitary modular assembly that can be replaced as a unit.

Interposed between a portion of housing 214, for example back member 230, and rain sensor unit 222 is a biasing member 232 which urges detecting surface 224 of rain sensor unit 222 into direct contact with inner surface 11" of windshield 12" to thereby optically couple to and contact the windshield surface under the spring force of biasing member 232. Biasing member 232 preferably comprises a resilient member, such as a helical spring or urethane or plastic disc spring or the like. It should be understood that when detecting surface 224 makes contact with the outer surface of adhesive layer 218, biasing member 232 urges detecting surface 224 into contact with layer 218 to optically couple sensor 222 to windshield 12".

As best seen in FIG. 4, a mirror assembly 40', which is similar to the double ball joint interior mirror assembly 40 of the first embodiment, is detachably mounted to housing 214 by a mirror mount 42'. Mirror mount 42' is of similar construction to mirror mount 42 and engages a mounting button 235, which is secured or formed on back portion 230 of housing 214. Reference is made to the first embodiment for materials and methods of forming or securing mounting button 235 to the housing 214.

Mirror mount 42' engages the outer periphery of button 235 and provides a breakaway connection so that upon an impact, the interior mirror assembly will detach from button 235, thereby reducing the risk of injury to passengers in the vehicle. Similar to the first embodiment, interior mirror assembly 40' includes a mirror housing 44', which supports a mirror reflector element 46' therein. In the illustrated embodiment, a conventional flip actuator mechanism is shown, but it should be understood that other actuators, including electrical actuators, may, be included in housing 44'. Mirror housing 44' is attached to mirror mount 42' by a support arm 50', preferably a double ball and socket support arm with a first ball socket joint 51a' between support arm 50' and mirror mount 42' and a second ball socket joint 51b' between support arm 50' and housing 44'. In this manner, reflective element 46' can be repositioned over a wide range of motion.

As described in reference to the first embodiment, detecting surface 224 of rain sensor unit 222 may be alternatively biased to contact adhesive layer 218. Preferably, the connection between detecting surface 224 and adhesive 218 is sufficiently resilient to absorb vibrations in windshield, which may be provided by adhesive layer 218, when adhesive layer 218 is selected from the group of adhesives that are resilient in their cured states as described in reference to the first embodiment, or by detecting surface 224 of rain sensor 222.

Optionally, module 210 may include a second rain sensor unit 222', which is similarly supported in housing 214 and projects through a second port or opening 228' provided on windshield facing side 214a of housing 214. Furthermore, housing 214 preferably includes a second biasing member 232', which urges rain sensor unit 222' into optical contact with inner surface 11" of windshield 12" for detecting moisture on the inner surface of windshield 12". Second sensor unit 222' can be electrically coupled to a car area network to control the defrost cycle or demisting cycle of the air system of the vehicle. Optionally, the rain sensor electrical drive can be electrically coupled to and/or share components with any electrical drive or circuitry already present in the mirror assembly 40' such as available in automotive electrochromic rearview mirrors.

Rain sensor units 22, 122, 222 are preferably powered via electrically connections to the vehicle ignition system and/or its battery, which typically is twelve volts. Preferably, the signal outputs from rain sensor units 22, 122, 222 are directed to the vehicle windshield wiper controller or can be directed to a car area network such as described in U.S. patent application Ser. No. 08/679,681 entitled VEHICLE MIRROR DIGITAL INTERACTIVE MIRROR SYSTEM filed on Jul. 11, 1996 by O'Farrell et al., now U.S. Pat. No. 5,798,575, which is assigned to the Donnelly Corporation of Holland, Mich., the disclosure which is hereby incorporated by reference in its entirety. Similarly, where a second rain sensor is employed that detects moisture on the inner surface of the windshield, as described above, the second rain sensor can be electrically coupled to the car area network to control the defrost cycle or demisting cycle of the air system of the vehicle. Optionally, the rain sensor electrical drive can be electrically coupled to and/or share components with any electrical drive or circuitry already present in mirror assembly 40, 40' such as available in automotive electrochromic rearview mirrors.

Rain sensor module assemblies 10, 110, 210 have many commercially attractive advantages. As mentioned previously, rain sensor mounting buttons 17 and 117 can be attached by the windshield manufacturer at the time of fabrication of the windshield and shipped to the automobile assembly plant fully assembled. Optionally, the shape and size of the outer solid portion 17a or 117a of rain sensor mounting button 17 or 117 may be the same as that of the mirror button 35 so that mirror assembly 40 or 40' may mount directly onto rain sensor mounting button 17 or 117 in lieu of the rain sensor module assembly, which provides the automaker with greater freedom of choice to include or not to include a rain sensor unit in the vehicle. In the event that the rain sensor unit is omitted, a blank insert may be placed to plug opening 17b or 117b.

The size and dimensions of rain sensor mounting buttons 17, 117, rain sensor modules 22, 122, 222 and mirror mounts 42, 142, 242 are preferably generally commensurate in size so that the installation of a rain sensor module assembly 10, 110, or 210 is compact and unobtrusive. In preferred form, the footprint of rain sensor module assembly 10, 110, 210 is less than about four square inches. In a more preferred form, the footprint of rain sensor module assembly 10, 110, 210 is less than about two square inches. In a most preferred form, the footprint of rain sensor module assembly 10, 110, 210 is less than about one square inch.

As previously described and as shown in the various figures, it is desirable that the rain sensor mounting member attached to the windshield and the rearview mirror mounting button provided on the rain sensor module are generally aligned along a common axis when the rain sensor module is mounted to the vehicle in order to provide a mounting of a rearview mirror assembly to the rain sensor module that is generally coaxial with the mounting of the rain sensor module to the windshield. Such is shown in FIGS. 1 and 2 where the rain sensor mounting button 17, the rain sensor unit 22, detecting surface 24 and mirror mounting button 35 are substantially aligned along common axis AA, thus minimizing the footprint presented by the assembly when installed to the windshield in the vehicle.

Optionally, a ceramic black frit layer, as is commonly known in the windshield fabrication art, can be used on the inner surface 11, 11', 11" of windshield 12, 12', 12" to hide the attachment of location of rain sensor module 10, 110, 210. However, the center portion of such a ceramic layer should include a central opening or at least provide efficient transmission for the output of the light emitters and the rain sensor unit at the point of contact a detecting surface 24, 124, 224 to windshield 12, 12', 12" or to the adhesive layer 18, 118, 218.

It should be understood that rain sensor module assembly 10, 110, 210 can accommodate a wide variety of mirror assemblies. Therefore, rain sensor module assemblies 10, 110, 210 have broad application and may be used in most countries. Furthermore, rain sensor module assemblies 10, 110, 210 permit the automaker to have essentially unlimited choices of mirror supplier. Moreover, rain sensor module assemblies 10, 110, 210 do not increase the weight of the respective mirror assembly and, therefore, do not negatively impact the vibration characteristics of the mirror assembly. In addition, as described above, rain sensor module assemblies 10, 110, 210 may optionally include a second rain sensor unit for detecting moisture on the inner surface of the windshield. In this embodiment, the second rain sensor may be similarly optically coupled to the inner surface of the windshield and further, coupled to the controls of the blower of the defrost and ventilation system of the vehicle, for example via a car area network, in order to activate the blower to demist the inner surface of the windshield.

Also, while illustrated herein is a mount for application to a vehicle windshield, the concept of this invention can also be beneficially applied to other glass or other transparent panels. Also, aspects of this invention can be applied to a variety of rain sensor types including windshield contacting units where the detecting surface contacts the windshield surface, and non-windshield contacting units, such as are described in PCT Application WO 94/27262 published Nov. 24, 1994 to Dennis Hegyl, the disclosure of which is incorporated by reference in its entirety herein, where the detecting surface of the rain sensor does not contact the windshield surface, and is stood-off therefrom. Also, the rain sensor module may optionally accommodate sensor/circuit/ displays for vehicle functions and accessories other than for a moisture sensing function. For example, a compass sensor such as a flux gate, magnetoinductive, magnetoresistive or magnetocapacitive sensor and/or a compass display can be accommodated at, within or on the rain sensor module. Other sensors and/or displays can be similarly accommodated such as of vehicle altitude and/or incline (of particular interest in sport utility vehicles), seat occupancy, air bag activation enable/disable, and headlamp intensity/daylight intensity photosensors, and their like. Optionally, antennae, transmitters and receivers, along with any associated displays and sensors, for geographic positioning satellite (GPS) systems, pagers, cellular phone systems, pagers, cellular phone systems, ONSTAR systems, security systems, tire monitoring systems, remote fueling systems where vehicle fueling and/or payment/charging for fuel is remotely achieved, remote keyless entry systems, garage and/or security door opener systems, INTERNET interfaces, vehicle tracking systems, remote car door unlock systems, e-mail systems, toll booth interactions systems, highway information systems, traffic warning systems, home access systems and their like can be mounted at, within or on the rain sensor module, or at, within or on the rearview mirror attached thereto, or at, within or on a pod attached to the rain sensor module or to the rearview mirror attached thereto. Therefore, it will be understood that the embodiments shown in the drawings and described above are merely for illustrative purposes, and are not intended to limit the scope of the invention which is defined by claims which follow.

The embodiments of the invention in which an exclusive property or privilege is claimed are defined as follows:

1. A rain sensor mounting system suitable for use in a vehicle equipped with a vehicle windshield, said system comprising:
  a module assembly;
  an attachment member on an inner surface of the vehicle windshield;
  said module assembly adapted for attachment to said attachment member on the inner surface of the vehicle windshield;
  said module assembly comprising a first side configured to be generally adjacent the inner surface of the vehicle windshield when said module assembly attaches to said attachment member;
  said module assembly further comprising a second side, said second side being generally opposing said first side;
  a rearview mirror assembly mounting member provided at said second side of said module assembly;
  a double ball joint rearview mirror assembly;
  said double ball joint rearview mirror assembly comprising a mirror mount;
  said mirror mount adapted for attachment to said rearview mirror assembly mounting member provided at said second side of said module assembly;
  said module assembly including a rain sensor;
  said rain sensor comprising a detecting surface; and
  wherein said detecting surface of said rain sensor contacts the inner surface of the windshield when said module assembly is attached to said attachment member on the inner surface of the vehicle windshield.

2. The rain sensor mounting system according to claim 1, wherein said module assembly includes an access opening and a cover.

3. The rain sensor mounting system according to claim 2, wherein said cover comprises a removable cover.

4. The rain sensor mounting system according to claim 3, wherein said cover comprises at least one releasable fastener.

5. The rain sensor mounting system according to claim 4, wherein said releasable fastener comprises a fastener chosen from a clip, a screw, a snap, and a latch.

6. The rain sensor mounting system according to claim 2, wherein said second side includes said cover.

7. The rain sensor mounting system according 1, wherein said module assembly comprises a housing and wherein said housing comprises a polymer material.

8. The rain sensor mounting system according to claim 7, wherein said polymer material comprises one of a nylon material, an ABS material, an engineering resin material, and a polyolefin material.

9. The rain sensor mounting system according to claim 1, wherein said rain sensor comprises electrical circuitry.

10. The rain sensor mounting system according to claim 1, wherein said rain sensor comprises a light emitting source, and wherein light from said light emitting source is refracted by the inner surface of the vehicle windshield and impinges said detecting surface.

11. The rain sensor mounting system according to claim 1, wherein said rain sensor comprises electronic circuitry for generating an electrical signal indicative of detection of moisture on the windshield.

12. The rain sensor mounting system according to claim 11, wherein said module assembly comprises a housing and wherein said housing houses at least a portion of said electronic circuitry.

13. The rain sensor mounting system according to claim 1, wherein said module assembly includes electronic circuitry associated with said rain sensor and wherein said electronic circuitry at least one of receives an input from a vehicle electrical accessory and delivers an output to a vehicle electrical accessory.

14. The rain sensor mounting system according to claim 1, wherein said module assembly includes electronic circuitry associated with said rain sensor and wherein said electronic circuitry shares at least one component of at least one vehicle electrical accessory.

15. The rain sensor mounting system according to claim 1, wherein said module assembly includes electronic circuitry associated with said rain sensor and wherein said electronic circuitry shares at least one component of an automatic dimming circuitry.

16. The rain sensor mounting system according to claim 1, wherein said detecting surface of said rain sensor optically couples to the inner surface of the windshield when said module assembly is attached to said attachment member on the inner surface of the vehicle windshield.

17. The rain sensor mounting system according to claim 1, wherein said detecting surface of said rain sensor is urged to optically couple to the inner surface of the windshield when said module assembly is attached to said attachment member on the inner surface of the vehicle windshield.

18. The rain sensor mounting system according to claim 1, wherein said rain sensor comprises a removable rain sensor unit.

19. The rain sensor mounting system according to claim 1, wherein said rain sensor generates an electrical signal for at least one of a wiper system, a sunroof system, a ventilation system, and a traction control system.

20. The rain sensor mounting system according to claim 1, wherein said first side of said module assembly is adapted to attach to said attachment member by at least one of a snap-on attachment and a twist-on attachment.

21. The rain sensor mounting system according to claim 1, wherein said attachment member comprises a contiguous mounting member.

22. The rain sensor mounting system according to claim 1, wherein said attachment member comprises an annular member.

23. The rain sensor mounting system according to claim 22, wherein said annular member includes a central opening, said rain sensor contacting the inner surface of the vehicle windshield at said central opening.

24. The rain sensor mounting system according to claim 1, wherein said attachment member comprises at least one rail.

25. The rain sensor mounting system according to claim 1, wherein said attachment member comprises a non-contiguous mounting member.

26. The rain sensor mounting system according to claim 1, wherein said attachment member comprises a pair of rails.

27. The rain sensor mounting system according to claim 1, wherein said rearview mirror assembly mounting member comprises a mirror mounting button.

28. The rain sensor mounting system according to claim 27, wherein said mirror mounting button is attached to said module assembly at said second side.

29. The rain sensor mounting system according to claim 27, wherein said mirror mounting button is formed by molding whereby said mirror mounting button comprises an integral member of said module assembly.

30. The rain sensor mounting system according to claim 1, said first side includes a portion configured for releasably mounting said module assembly to said attachment member.

31. The rain sensor mounting system according to claim 30, wherein said rearview mirror assembly mounting member and said portion are substantially aligned.

32. The rain sensor mounting system according to claim 1, wherein said attachment member includes a dimensional area comprising a first foot print, said mirror assembly mounting member including a dimensional area comprising a second foot print, and said first and second foot prints being substantially the same.

33. The rain sensor mounting system according to claim 1, wherein said double ball joint rearview mirror assembly comprises a mirror housing and a reflective element.

34. The rain sensor mounting system according to claim 33, wherein said reflective element comprises a variable reflectance mirror element.

35. The rain sensor mounting system according to claim 33, wherein said reflective element comprises a prismatic mirror element.

36. The rain sensor mounting system according to claim 33, wherein said reflective element comprises an electrochromic reflective element.

37. The rain sensor mounting system according to claim 36, wherein said electrochromic reflective element comprises an electrochemichromic reflective element.

38. The rain sensor mounting system according to claim 1, said module assembly comprising a resilient member, said resilient member urging said rain sensor to contact the inner surface of the vehicle windshield when said module assembly is mounted to the vehicle windshield.

39. The rain sensor mounting system according to claim 38, wherein said resilient member comprises a spring.

40. The rain sensor mounting system according to claim 39, wherein said spring comprises one chosen from a helical spring and a resilient disc.

41. The rain sensor mounting system according to claim 38, wherein said module assembly comprises a housing and wherein said housing includes an opening, said resilient member urging said rain sensor to contact the inner surface of the vehicle windshield at said opening.

42. The rain sensor mounting system according to claim 1, wherein said rain sensor comprises a modular unit.

43. The rain sensor mounting system according to claim 1, wherein said rain sensor comprises a body having a shape.

44. The rain sensor mounting system according to claim 43, wherein said shape comprises a cylindrical shape.

45. The rain sensor mounting system according to claim 44, wherein said body includes a circular end face having a diameter of approximately 3.3 centimeters.

46. The rain sensor mounting system according to claim 43, wherein said body includes a cross-section dimension, a body length, and a ratio of said cross-section dimension to said body length greater than 1.

47. The rain sensor mounting system according to claim 46, wherein said ratio is greater than 2.

48. The rain sensor mounting system according to claim 46, wherein said ratio is greater than 3.

49. The rain sensor mounting system according to claim 1, further comprising a second sensor, said second sensor accommodated in said module assembly.

50. The rain sensor mounting system according to claim 49, wherein said second sensor comprises a second rain sensor, said second rain sensor contacting the inner surface of the vehicle windshield for detecting moisture on an inner surface of the windshield when said module assembly is mounted to the inner surface of the windshield.

51. The rain sensor mounting system according to claim 50, wherein said second rain sensor is coupled to a ventilation system of the vehicle for activating a blower to demist the inner surface of the windshield.

52. The rain sensor mounting system according to claim 49, wherein said second sensor comprises one chosen from a compass sensor, a seat occupancy sensor, a vehicle altitude sensor, a vehicle inclination sensor, and a photo sensor.

53. The rain sensor mounting system according to claim 1, wherein at least one vehicular accessory is accommodated in said module assembly.

54. The rain sensor mounting system according to claim 1, wherein said at least one vehicular accessory comprises an accessory selected from the group consisting of an antenna, a transmitter, a receiver, a compass sensor, a GPS system accessory, a pager system accessory, a cellular phone system accessory, a security system accessory, a tire pressure monitoring system accessory, a remote fueling system accessory, a remote keyless entry system accessory, a garage door opener system accessory, an internet interface system accessory, a vehicle tracking system accessory, a remote car door unlock system accessory, an email system accessory, a toll booth transaction system accessory, a highway information system accessory, a traffic warning system accessory, and a home access system accessory.

55. The rain sensor mounting system according to claim 53, wherein said at least one vehicular accessory comprises an antenna.

56. The rain sensor mounting system according to claim 53, wherein said at least one vehicular accessory comprises a compass sensor.

57. The rain sensor mounting system according to claim 53, wherein said at least one vehicular accessory comprises a cellular phone system accessory.

58. The rain sensor mounting system according to claim 53, wherein said at least one vehicular accessory comprises a toll booth transaction system accessory.

59. The rain sensor mounting system according to claim 53, wherein said at least one vehicular accessory comprises a tire pressure monitoring system accessory.

60. The rain sensor mounting system according to claim 53, wherein said at least one vehicular accessory comprises a garage door opener system accessory.

61. The rain sensor mounting system according to claim 53, wherein said at least one vehicular accessory comprises a remote keyless entry system accessory.

62. The rain sensor mounting system according to claim 53, wherein said at least one vehicular accessory comprises a receiver.

63. The rain sensor mounting system according to claim 53, wherein said at least one vehicular accessory comprises a GPS system accessory.

64. The rain sensor mounting system according to claim 53, wherein said at least one vehicular accessory comprises a transmitter.

65. A rain sensor mounting system suitable for use in a vehicle equipped with a vehicle windshield, said system comprising:
a module assembly;
an attachment member on an inner surface of the vehicle windshield;
said module assembly adapted for attachment to said attachment member on the inner surface of the vehicle windshield;
said module assembly comprising a first side configured to be generally adjacent the inner surface of the vehicle windshield when said module assembly attaches to said attachment member;
said module assembly further comprising a second side, said second side being generally opposing said first side;
a rearview mirror assembly mounting member provided at said second side of said module assembly;
a rearview mirror assembly;
said rearview mirror assembly comprising a mirror mount;
said mirror mount adapted for attachment to said rearview mirror assembly mounting member provided at said second side of said module assembly;
said module assembly including a rain sensor;
wherein said rain sensor comprises a detecting surface;
wherein said rain sensor further comprises a light emitting source, and wherein light from said light emitting source is refracted by the inner surface of the vehicle windshield and impinges said detecting surface; and
wherein said detecting surface of said rain sensor is urged to contact the inner surface of the windshield when said module assembly is attached to said attachment member on the inner surface of the vehicle windshield.

66. The rain sensor mounting system according to claim 65, wherein said module assembly includes an access opening and a cover.

67. The rain sensor mounting system according to claim 66, wherein said cover comprises a removable cover.

68. The rain sensor mounting system according to claim 67, wherein said cover comprises at least one releasable fastener.

69. The rain sensor mounting system according to claim 68, wherein said releasable fastener comprises a fastener chosen from a clip, a screw, a snap, and a latch.

70. The rain sensor mounting system according to claim 66, wherein said second side includes said cover.

71. The rain sensor mounting system according to claim 65, wherein said module assembly comprises a housing and wherein said housing comprises a polymer material.

72. The rain sensor mounting system according to claim 71, wherein said polymer material comprises one of a nylon material, an ABS material, an engineering resin material, and a polyolefin material.

73. The rain sensor mounting system according to claim 65, wherein said rain sensor comprises electrical circuitry.

74. The rain sensor mounting system according to claim 65, wherein said rearview mirror assembly comprises a double ball joint rearview mirror assembly.

75. The rain sensor mounting system according to claim 65, wherein said rain sensor comprises electronic circuitry for generating an electrical signal indicative of detection of moisture on the windshield.

76. The rain sensor mounting system according to claim 75, wherein said module assembly comprises a housing and wherein said housing houses at least a portion of said electronic circuitry.

77. The rain sensor mounting system according to claim 65, wherein said module assembly includes electronic circuitry associated with said rain sensor and wherein said electronic circuitry at least one of receives an input from a vehicle electrical accessory and delivers an output to a vehicle electrical accessory.

78. The rain sensor mounting system according to claim 65, wherein said module assembly includes electronic circuitry associated with said rain sensor and wherein said electronic circuitry shares at least one component of at least one vehicle electrical accessory.

79. The rain sensor mounting system according to claim 65, wherein said module assembly includes electronic circuitry associated with said rain sensor and wherein said electronic circuitry shares at least one component of an automatic dimming circuitry.

80. The rain sensor mounting system according to claim 65, wherein said detecting surface of said rain sensor optically couples to the inner surface of the windshield when said module assembly is attached to said attachment member on the inner surface of the vehicle windshield.

81. The rain sensor mounting system according to claim 65, wherein said detecting surface of said rain sensor is urged to optically couple to the inner surface of the windshield when said module assembly is attached to said attachment member on the inner surface of the vehicle windshield.

82. The rain sensor mounting system according to claim 65, wherein said rain sensor comprises a removable rain sensor unit.

83. The rain sensor mounting system according to claim 65, wherein said rain sensor generates an electrical signal for at least one of a wiper system, a sunroof system, a ventilation system, and a traction control system.

84. The rain sensor mounting system according to claim 65, wherein said first side of said module assembly is adapted to attach to said attachment member by at least one of a snap-on attachment and a twist-on attachment.

85. The rain sensor mounting system according to claim 65, wherein said attachment member comprises a contiguous mounting member.

86. The rain sensor mounting system according to claim 65, wherein said attachment member comprises an annular member.

87. The rain sensor mounting system according to claim 65, wherein said annular member includes a central opening, said rain sensor contacting the inner surface of the vehicle windshield at said central opening.

88. The rain sensor mounting system according to claim 65, wherein said attachment member comprises at least one rail.

89. The rain sensor mounting system according to claim 65, wherein said attachment member comprises a non-contiguous mounting member.

90. The rain sensor mounting system according to claim 65, wherein said attachment member comprises a pair of rails.

91. The rain sensor mounting system according to claim 65, wherein said rearview mirror assembly mounting member comprises a mirror mounting button.

92. The rain sensor mounting system according to claim 91, wherein said mirror mounting button is attached to said module assembly at said second side.

93. The rain sensor mounting system according to claim 91, wherein said mirror mounting button is formed by molding whereby said mirror mounting button comprises an integral member of said module assembly.

94. The rain sensor mounting system according to claim 65, wherein said first side includes a portion configured for releasably mounting said module assembly to said attachment member.

95. The rain sensor mounting system according to claim 94, wherein said rearview mirror assembly mounting member and said portion are substantially aligned.

96. The rain sensor mounting system according to claim 65, wherein said attachment member includes a dimensional area comprising a first foot print, said mirror assembly mounting member including a dimensional area comprising a second foot print, and said first and second foot prints being substantially the same.

97. The rain sensor mounting system according to claim 65, wherein said rearview mirror assembly comprises a mirror housing and a reflective element.

98. The rain sensor mounting system according to claim 97, wherein said reflective element comprises a variable reflectance mirror element.

99. The rain sensor mounting system according to claim 97, wherein said reflective element comprises a prismatic mirror element.

100. The rain sensor mounting system according to claim 97, wherein said reflective element comprises an electrochromic reflective element.

101. The rain sensor mounting system according to claim 100, wherein said electrochromic reflective element comprises an electrochemichromic reflective element.

102. The rain sensor mounting system according to claim 65, said module assembly comprising a resilient member, said resilient member urging said rain sensor to contact the inner surface of the vehicle windshield when said module assembly is mounted to the vehicle windshield.

103. The rain sensor mounting system according to claim 102, wherein said resilient member comprises a spring.

104. The rain sensor mounting system according to claim 103, wherein said spring comprises one chosen from a helical spring and a resilient disc.

105. The rain sensor mounting system according to claim 102, wherein said module assembly comprises a housing and wherein said housing includes an opening, said resilient member urging said rain sensor to contact the inner surface of the vehicle windshield at said opening.

106. The rain sensor mounting system according to claim 65, wherein said rain sensor comprises a modular unit.

107. The rain sensor mounting system according to claim 65, wherein said rain sensor comprises a body having a shape.

108. The rain sensor mounting system according to claim 107, wherein said shape comprises a cylindrical shape.

109. The rain sensor mounting system according to claim 108, wherein said body includes a circular end face having a diameter of approximately 3.3 centimeters.

110. The rain sensor mounting system according to claim 107, wherein said body includes a cross-section dimension, a body length, and a ratio of said cross-section dimension to said body length greater than 1.

111. The rain sensor mounting system according to claim 110, wherein said ratio is greater than 2.

112. The rain sensor mounting system according to claim 110, wherein said ratio is greater than 3.

113. The rain sensor mounting system according to claim 65, further comprising a second sensor, said second sensor accommodated in said module assembly.

114. The rain sensor mounting system according to claim 113, wherein said second sensor comprises a second rain sensor, said second rain sensor contacting the inner surface of the vehicle windshield for detecting moisture on an inner surface of the windshield when said module assembly is mounted to the inner surface of the windshield.

115. The rain sensor mounting system according to claim 114, wherein said second rain sensor is coupled to a ventilation system of the vehicle for activating a blower to demist the inner surface of the windshield.

116. The rain sensor mounting system according to claim 113, wherein said second sensor comprises one chosen from a compass sensor, a seat occupancy sensor, a vehicle altitude sensor, a vehicle inclination sensor, and a photo sensor.

117. The rain sensor mounting system according to claim 65, wherein at least one vehicular accessory is accommodated in said module assembly.

118. The rain sensor mounting system according to claim 117, wherein said at least one vehicular accessory comprises an accessory selected from the group consisting of an antenna, a transmitter, a receiver, a compass sensor, a GPS system accessory, a pager system accessory, a cellular phone system accessory, a security system accessory, a tire pressure monitoring system accessory, a remote fueling system accessory, a remote keyless entry system accessory, a garage door opener system accessory, an internet interface system accessory, a vehicle tracking system accessory, a remote car door unlock system accessory, an email system accessory, a toll booth transaction system accessory, a highway information system accessory, a traffic warning system accessory, and a home access system accessory.

119. The rain sensor mounting system according to claim 117, wherein said at least one vehicular accessory comprises an antenna.

120. The rain sensor mounting system according to claim 117, wherein said at least one vehicular accessory comprises a compass sensor.

121. The rain sensor mounting system according to claim 117, wherein said at least one vehicular accessory comprises a cellular phone system accessory.

122. The rain sensor mounting system according to claim 117, wherein said at least one vehicular accessory comprises a toll booth transaction system accessory.

123. The rain sensor mounting system according to claim 117, wherein said at least one vehicular accessory comprises a tire pressure monitoring system accessory.

124. The rain sensor mounting system according to claim 117, wherein said at least one vehicular accessory comprises a garage door opener system accessory.

125. The rain sensor mounting system according to claim 117, wherein said at least one vehicular accessory comprises a remote keyless entry system accessory.

126. The rain sensor mounting system according to claim 117, wherein said at least one vehicular accessory comprises a receiver.

127. The rain sensor mounting system according to claim 117, wherein said at least one vehicular accessory comprises a GPS system accessory.

128. The rain sensor mounting system according to claim 117, wherein said at least one vehicular accessory comprises a transmitter.

129. A rain sensor mounting system suitable for use in a vehicle equipped with a vehicle windshield, said system comprising:
a module assembly;
an attachment member on an inner surface of the vehicle windshield;
said module assembly adapted for attachment to said attachment member on the inner surface of the vehicle windshield;
said module assembly comprising a first side configured to be generally adjacent the inner surface of the vehicle windshield when said module assembly attaches to said attachment member;
said module assembly further comprising a second side, said second side being generally opposing said first side;
a rearview mirror assembly mounting member provided at said second side of said module assembly;
a rearview mirror assembly;
said rearview mirror assembly comprising a mirror mount;
said mirror mount adapted for attachment to said rearview mirror assembly mounting member provided at said second side of said module assembly;
said module assembly including a rain sensor;
wherein said rain sensor comprises a detecting surface;
wherein said rain sensor further comprises a light emitting source, and wherein light from said light emitting source is refracted by the inner surface of the vehicle windshield and impinges said detecting surface;
wherein said detecting surface of said rain sensor contacts the inner surface of the windshield when said module assembly is attached to said attachment member on the inner surface of the vehicle windshield; and
wherein at least one vehicular accessory is accommodated in said module assembly.

130. The rain sensor mounting system according to claim 129, wherein said module assembly includes an access opening and a cover.

131. The rain sensor mounting system according to claim 130, wherein said cover comprises a removable cover.

132. The rain sensor mounting system according to claim 131, wherein said cover comprises at least one releasable fastener.

133. The rain sensor mounting system according to claim 132, wherein said releasable fastener comprises a fastener chosen from a clip, a screw, a snap, and a latch.

134. The rain sensor mounting system according to claim 130, wherein said second side includes said cover.

135. The rain sensor mounting system according to claim 129, wherein said module assembly comprises a housing and wherein said housing comprises a polymer material.

136. The rain sensor mounting system according to claim 135, wherein said polymer material comprises one of a nylon material, an ABS material, an engineering resin material, and a polyolefin material.

137. The rain sensor mounting system according to claim 129, wherein said rain sensor comprises electrical circuitry.

138. The rain sensor mounting system according to claim 129, wherein said rearview mirror assembly comprises a double ball joint rearview mirror assembly.

139. The rain sensor mounting system according to claim 129, wherein said rain sensor comprises electronic circuitry for generating an electrical signal indicative of detection of moisture on the windshield.

140. The rain sensor mounting system according to claim 139, wherein said module assembly comprises a housing and wherein said housing houses at least a portion of said electronic circuitry.

141. The rain sensor mounting system according to claim 129, wherein said module assembly includes electronic circuitry associated with said rain sensor and wherein said electronic circuitry at least one of receives an input from another vehicle electrical accessory and delivers an output to another vehicle electrical accessory.

142. The rain sensor mounting system according to claim 129, wherein said module assembly includes electronic circuitry associated with said rain sensor and wherein said electronic circuitry shares at least one component of said at least one vehicle electrical accessory.

143. The rain sensor mounting system according to claim 129, wherein said module assembly includes electronic circuitry associated with said rain sensor and wherein said electronic circuitry shares at least one component of an automatic dimming circuitry.

144. The rain sensor mounting system according to claim 129, wherein said detecting surface of said rain sensor optically couples to the inner surface of the windshield when said module assembly is attached to said attachment member on the inner surface of the vehicle windshield.

145. The rain sensor mounting system according to claim 129, wherein said detecting surface of said rain sensor is urged to optically couple to the inner surface of the windshield when said module assembly is attached to said attachment member on the inner surface of the vehicle windshield.

146. The rain sensor mounting system according to claim 129, wherein said rain sensor comprises a removable rain sensor unit.

147. The rain sensor mounting system according to claim 129, wherein said rain sensor generates an electrical signal for at least one of a wiper system, a sunroof system, a ventilation system, and a traction control system.

148. The rain sensor mounting system according to claim 129, wherein said first side of said module assembly is adapted to attach to said attachment member by at least one of a snap-on attachment and a twist-on attachment.

149. The rain sensor mounting system according to claim 129, wherein said attachment member comprises a contiguous mounting member.

150. The rain sensor mounting system according to claim 129, wherein said attachment member comprises an annular member.

151. The rain sensor mounting system according to claim 150, wherein said annular member includes a central opening, said rain sensor contacting the inner surface of the vehicle windshield at said central opening.

152. The rain sensor mounting system according to claim 129, wherein said attachment member comprises at least one rail.

153. The rain sensor mounting system according to claim 129, wherein said attachment member comprises a non-contiguous mounting member.

154. The rain sensor mounting system according to claim 129, wherein said attachment member comprises a pair of rails.

155. The rain sensor mounting system according to claim 129, wherein said rearview mirror assembly mounting member comprises a mirror mounting button.

156. The rain sensor mounting system according to claim 155, wherein said mirror mounting button is attached to said module assembly at said second side.

157. The rain sensor mounting system according to claim 155, wherein said mirror mounting button is formed by molding whereby said mirror mounting button comprises an integral member of said module assembly.

158. The rain sensor mounting system according to claim 129, wherein said first side includes a portion configured for releasably mounting said module assembly to said attachment member.

159. The rain sensor mounting system according to claim 158, wherein said rearview mirror assembly mounting member and said portion are substantially aligned.

160. The rain sensor mounting system according to claim 129, wherein said attachment member includes a dimensional area comprising a first foot print, said mirror assembly mounting member including a dimensional area comprising a second foot print, and said first and second foot prints being substantially the same.

161. The rain sensor mounting system according to claim 129, wherein said rearview mirror assembly comprises a mirror housing and a reflective element.

162. The rain sensor mounting system according to claim 161, wherein said reflective element comprises a variable reflectance mirror element.

163. The rain sensor mounting system according to claim 161, wherein said reflective element comprises a prismatic mirror element.

164. The rain sensor mounting system according to claim 161, wherein said reflective element comprises an electrochromic reflective element.

165. The rain sensor mounting system according to claim 164, wherein said electrochromic reflective element comprises an electrochemichromic reflective element.

166. The rain sensor mounting system according to claim 129, said module assembly comprising a resilient member, said resilient member urging said rain sensor to contact the inner surface of the vehicle windshield when said module assembly is mounted to the vehicle windshield.

167. The rain sensor mounting system according to claim 166, wherein said resilient member comprises a spring.

168. The rain sensor mounting system according to claim 167, wherein said spring comprises one chosen from a helical spring and a resilient disc.

169. The rain sensor mounting system according to claim 166, wherein said module assembly comprises a housing and wherein said housing includes an opening, said resilient member urging said rain sensor to contact the inner surface of the vehicle windshield at said opening.

170. The rain sensor mounting system according to claim 129, wherein said rain sensor comprises a modular unit.

171. The rain sensor mounting system according to claim 129, wherein said rain sensor comprises a body having a shape.

172. The rain sensor mounting system according to claim 171, wherein said shape comprises a cylindrical shape.

173. The rain sensor mounting system according to claim 172, wherein said body includes a circular end face having a diameter of approximately 3.3 centimeters.

174. The rain sensor mounting system according to claim 174, wherein said body includes a cross-section dimension, a body length, and a ratio of said cross-section dimension to said body length greater than 1.

175. The rain sensor mounting system according to claim 174, wherein said ratio is greater than 2.

176. The rain sensor mounting system according to claim 174, wherein said ratio is greater than 3.

177. The rain sensor mounting system according to claim 129, further comprising a second sensor, said second sensor accommodated in said module assembly.

178. The rain sensor mounting system according to claim 177, wherein said second sensor comprises a second rain sensor, said second rain sensor contacting the inner surface of the vehicle windshield for detecting moisture on an inner surface of the windshield when said module assembly is mounted to the inner surface of the windshield.

179. The rain sensor mounting system according to claim 178, wherein said second rain sensor is coupled to a ventilation system of the vehicle for activating a blower to demist the inner surface of the windshield.

180. The rain sensor mounting system according to claim 179, wherein said second sensor comprises one chosen from a compass sensor, a seat occupancy sensor, a vehicle altitude sensor, a vehicle inclination sensor, and a photo sensor.

181. The rain sensor mounting system according to claim 129, wherein said at least one vehicular accessory comprises an accessory selected from the group consisting of an antenna, a transmitter, a receiver, a compass sensor, a GPS system accessory, a pager system accessory, a cellular phone system accessory, a security system accessory, a tire pressure monitoring system accessory, a remote fueling system accessory, a remote keyless entry system accessory, a garage door opener system accessory, an internet interface system accessory, a vehicle tracking system accessory, a remote car door unlock system accessory, an email system accessory, a toll booth transaction system accessory, a highway information system accessory, a traffic warning system accessory, and a home access system accessory.

182. The rain sensor mounting system according to claim 129, wherein said at least one vehicular accessory comprises a transmitter.

183. The rain sensor mounting system according to claim 129, wherein said at least one vehicular accessory comprises an antenna.

184. The rain sensor mounting system according to claim 129, wherein said at least one vehicular accessory comprises a compass sensor.

185. The rain sensor mounting system according to claim 129, wherein said at least one vehicular accessory comprises a cellular phone system accessory.

186. The rain sensor mounting system according to claim 129, wherein said at least one vehicular accessory comprises a toll booth transaction system accessory.

187. The rain sensor mounting system according to claim 129, wherein said at least one vehicular accessory comprises a tire pressure monitoring system accessory.

188. The rain sensor mounting system according to claim 129, wherein said at least one vehicular accessory comprises a garage door opener system accessory.

189. The rain sensor mounting system according to claim 129, wherein said at least one vehicular accessory comprises a remote keyless entry system accessory.

190. The rain sensor mounting system according to claim 129, wherein said at least one vehicular accessory comprises a receiver.

191. The rain sensor mounting system according to claim 129, wherein said at least one vehicular accessory comprises a GPS system accessory.

* * * * *

UNITED STATES PATENT AND TRADEMARK OFFICE
CERTIFICATE OF CORRECTION

PATENT NO. : 6,968,736 B2
APPLICATION NO. : 10/348514
DATED : November 29, 2005
INVENTOR(S) : Niall R. Lynam Page 1 of 1

It is certified that error appears in the above-identified patent and that said Letters Patent is hereby corrected as shown below:

Column 1:
Line 4, Insert --37 CFR 1.53-- after "under".

Column 8:
Line 50, "Bufton" should be --Button--.

Column 16:
Line 9, Claim 7, Insert --to claim-- after "according".

Column 17:
Line 30, Claim 30, Insert --wherein-- after "1,".

Column 25:
Line 59, Claim 174, "174" should be --171--.

Signed and Sealed this

Seventeenth Day of February, 2009

JOHN DOLL
*Acting Director of the United States Patent and Trademark Office*